United States Patent [19]

Pfalzgraf et al.

[11] Patent Number: 4,488,527
[45] Date of Patent: Dec. 18, 1984

[54] DEVICE FOR CONTROLLING THE SPEED OF TRAVEL OF AN AUTOMOTIVE VEHICLE

[75] Inventors: Manfred Pfalzgraf, Frankfurt am Main; Kurt Probst, Schwalbach, both of Fed. Rep. of Germany

[73] Assignee: VDO Adolf Schindling AG, Frankfurt am Main, Fed. Rep. of Germany

[21] Appl. No.: 531,125

[22] Filed: Sep. 12, 1983

[30] Foreign Application Priority Data

Oct. 9, 1982 [DE] Fed. Rep. of Germany ....... 3237535

[51] Int. Cl.³ .............................................. F02D 33/00
[52] U.S. Cl. ................................. 123/399; 123/351; 180/171
[58] Field of Search ............... 123/399, 351, 352, 361, 123/198 D; 180/170, 171

[56] References Cited

U.S. PATENT DOCUMENTS

| | | | |
|---|---|---|---|
| 3,828,742 | 8/1974 | Weis | 123/351 |
| 4,084,559 | 4/1978 | Wallbaum | 123/351 |
| 4,301,883 | 11/1981 | Collonia | 123/352 |
| 4,314,237 | 2/1982 | Darrow | 180/171 |

FOREIGN PATENT DOCUMENTS 58-28575 2/1983 Japan ................... 123/351

Primary Examiner—William A. Cuchlinski, Jr.
Attorney, Agent, or Firm—Martin A. Farber

[57] ABSTRACT

A device for controlling the speed of travel of an automotive vehicle, having a desired-value transmitter 2 which is adjustable by a gas pedal 1 and the output signal of which can act on a setting member 5 of an element which controls the fuel/air mixture. The device has a setting-member transmitter 29, which produces a signal corresponding to the position of the setting member 5, as well as an alarm circuit 6, 7 via which an alarm signal can be fed to an alarm device when, the desired-value transmitter 2 not being actuated, the setting member 5 is in a gas position. The alarm circuit 6, 7 is developed in such a manner that an error in the alarm circuit 6, 7 can also be indicated.

20 Claims, 5 Drawing Figures

DEVICE FOR CONTROLLING THE SPEED OF TRAVEL OF AN AUTOMOTIVE VEHICLE

The invention relates to a device for controlling the speed of travel of an automotive vehicle, having a desired-value transmitter which is adjustable by a gas pedal and the output signal of which can act on a setting member of an element which controls the fuel/air mixture. The device has a setting-member transmitter, which produces a signal corresponding to the position of the setting member, as well as an alarm circuit via which an alarm signal can be fed to an alarm device when, the desired-value transmitter not being actuated, the setting member is in a gas position.

In one such known device, a pedal contact, which can be actuated by the gas pedal, and a setting-member contact, which can be actuated by the setting member, are connected in parallel to each other in the alarm circuit. The pedal contact is opened in the idle position of the gas pedal and the setting-member contact is closed in the idle position of the setting member. Since the switch point of the pedal contact lies at a lower deflection of the gas pedal out of the idle position than the switch point of the setting-member contact upon corresponding deflection of the setting member out of from the idle position, a flow of current through the alarm circuit is always possible if the control device is intact, which means that no alarm signal is given off. However, if the setting member is not in its idle position although the gas pedal is not actuated, then pedal contact and setting-member contact are open and thus the flow of current in the alarm circuit is interrupted. This means that an alarm signal is fed to the alarm device.

In case of a malfunction of the pedal contact or of the setting-member contact as a result of which one of these contacts remains permanently closed, a malfunction of the setting member can no longer be detected, which can lead to dangerous driving situations.

The object of the invention, therefore, is to create a device of the foregoing type by which a defect in the alarm circuit can be indicated.

This object is achieved in accordance with the invention in the manner that a first branch (6) of the alarm circuit gives off an alarm signal at its output when, the gas pedal (1) being actuated, the desired-value transmitter (2) produces an idle signal, and that a second branch (7) of the alarm circuit gives off an alarm signal at its output when, the setting member (5) being actuated, the setting-member transmitter (29) produces an idle signal. In this way not only is a monitoring of the correct operation of the setting member obtained, but at the same time also a monitoring of the correct operation of the alarm circuit itself. In this way, all functions which are to be monitored can be covered by a single alarm device if the output of the first branch (6) and the output of the second branch (7) are brought together and connected to an alarm device.

In order to avoid interaction of the two branches of the alarm circuit, the alarm signal of the first branch (6) can, starting from the idle position of gas pedal (1) and/or setting member (5), be given off before the alarm signal of the second branch (7) of the alarm circuit.

The first branch (6) of the alarm circuit may contain a comparator (10) on whose first input (11) there is present a constant electric signal which corresponds to a given position of deflection of the desired-value transmitter (2) out of the idle position and on whose second input (13) there is present an electric signal which corresponds to the instantaneous position of the desired-value transmitter (2), the output of the comparator (10) being fed to a first input (15) of an AND gate (14) to whose second input (16) a signal can be applied when the gas pedal (1) is deflected out of the idle position. The second branch (7) of the alarm circuit has a second comparator (20) on whose first input (21) there is a constant electric signal which corresponds to a given position of deflection of the setting-member transmitter (29) out of the idle position and on whose second input (23) there is an electric signal which corresponds to the instantaneous position of the setting-member transmitter (29), the output of the second comparator (20) being fed to a first input (25) of a second AND gate (24) to whose second input (26) a signal can be applied when the setting member (5) is deflected from the idle position. Both the output of the first AND gate (14) and the output of the second AND gate (24) are connected to the alarm device. If the first input (11) of the first comparator (10) is in this case the positive input and if a signal which increases in size upon an increase in the deflection of the desired-value transmitter (2) out of its idle position is present at the negative input (13) of the comparator (10) then a positive output signal is present at the comparator until the signal of the desired value transmitter corresponds to the size of the constant positive signal at the positive input.

The second comparator operates in the same way, in that the first input (21) of the second comparator (20) is the positive input and a signal which increases in size upon an increase in the deflection of the setting-member transmitter (29) from its idle position is present on the negative input (23) of the comparator (20).

The input signals of the comparators are produced by simple means if the first inputs (11, 21) of the first and second comparators (10, 20) are connected to respective voltage dividers (12, 22) and if the second inputs (13, 23) of the first and second comparators (10, 20) are connected to respective potentiometers which form the desired-value transmitter (2) and the setting-member transmitter (29) respectively.

The monitoring of the function of the gas pedal is preferably effected in the manner that a pedal contact (18) which can be actuated by the gas pedal (1) and is open in the idle position of the gas pedal (1) is associated with the second input (16) of the first AND gate (14). In the same way, the monitoring of the function of the setting member is effected in the manner that a setting-member contact (28), which can be actuated by the setting member (5) and is closed in the idle position of the setting member (5), is associated with the second input (26) of the second AND gate (24). The setting member contact (28) is opened when the setting member (5) is actuated. The first input (25) of the AND gate (24) is inverted.

If the switch point of the pedal contact (16) lies at a greater deflection of the gas pedal (1) out of the idle position than the switch point of the first comparator (10), then the input of the AND gate coming from the comparator is fed a positive signal until the size of the desired-value signal has reached the size of the constant signal at the positive input of the comparator. During this time, no positive signal is present as yet at the second input of the AND gate due to the open pedal contact. The positive signal of the comparator is, however, extinguished. Only upon further deflection of the gas pedal does the pedal switch close and the second input of the AND gate receive a positive signal. Since a positive signal, however, is no longer present at the first input, the AND gate can also not feed an alarm signal to the alarm device. If the desired-value transmitter is defective, and therefore the positive output signal of the first comparator remains in existence, then, after the closing of the pedal contact, positive signals are present at both inputs of the first AND gate so that an alarm signal is given off at the output of said AND gate.

The second comparator (20) operates in accordance with the same principle, the switch point in this case lying at a greater deflection of the setting member (5) than the switch point of the setting-member contact (28). This means that the comparator feeds a positive signal to the second AND gate until the size of the setting-member transmitter signal reaches the size of the constant signal at the positive input of the comparator. Thus the comparator is switched and feeds a negative signal to the AND gate. Since this signal is inverted at the AND gate, the previously negatively acting signal is changed into a positive signal. Upon further displacement of the setting member the previously closed setting-member contact opens and the second input of the AND gate receives a negative signal rather than a positive signal. In case of a defect in the setting-member transmitter or the setting-member contact, identical signals will be present at the inputs of the AND gate so that it gives off an alarm signal.

In order to avoid interactions of the branches of the alarm circuit, the switch point of the setting-member contact (28) is located at a greater deflection of the setting member (5) than the switch point of the pedal contact (18) upon corresponding deflection of the gas pedal (1).

The alarm device may be a light (8).

In order to avoid a false alarm in the event of brief disturbances and upon the switching processes, a time-delay member, which is preferably an RC member (19), can be arranged in series with the alarm device.

Continuous rather than merely brief actuation of the alarm device is obtained if a storage member (30), for example a flip-flop, is connected in series with the alarm device.

If an electronic controller (3) of the control device can be acted on by the output signal of the alarm circuit so as to displace the control device in load-reducing fashion, then the position of the setting member can be automatically set back to such an extent that while it is still possible to drive to a repair shop, a dangerous shifting into the full-gas position is impossible.

With the above and other objects and advantages in view, the present invention will become more clearly understood in connection with the detailed description of a preferred embodiment, when considered with the accompanying drawings, of which:

Figure 1:
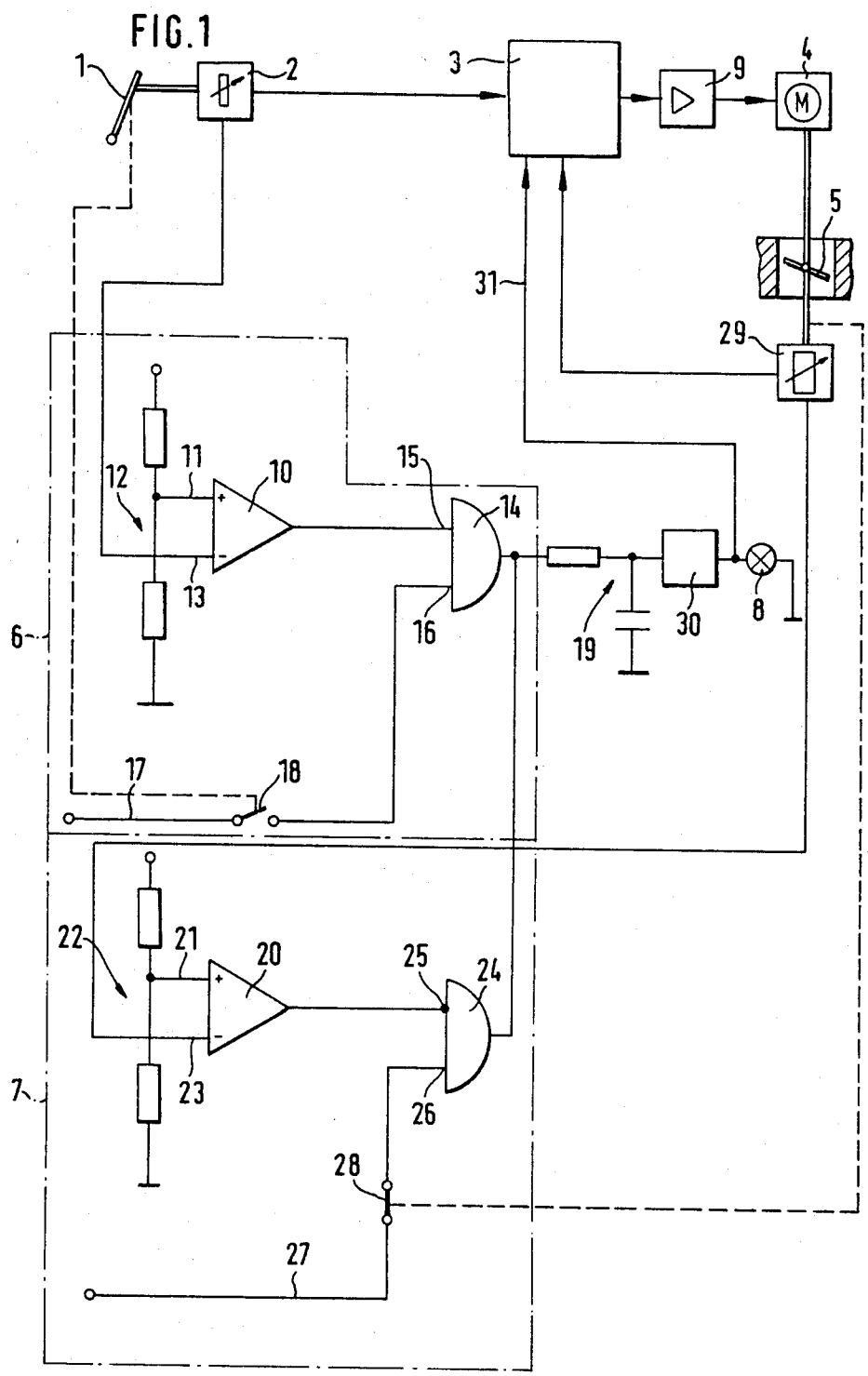
FIG. 1 is a circuit diagram of one illustrative embodiment of a device in accordance with the invention.

The device shown in FIG. 1 has a desired-value transmitter 2 which is displaceable by a gas pedal 1 and is developed as a potentiometer. Its output signal is fed to an electric controller 3 which controls a setting-member drive 4 via an amplifier 9. A setting member 5, formed by a throttle valve for controlling the fuel-air mixture, and a setting member transmitter 29 formed by a potentiometer can be displaced by the setting-member drive 4.

By an alarm circuit comprising a first branch 6 and a second branch 7 by which an alarm device formed by a light 8 can be controlled, the proper operation of the device for the controlling of the travel speed can be monitored. The first branch 6 of the alarm circuit contains a comparator 10 to whose first positive input 11 a voltage divider 12 is connected. By this voltage divider 12 the input 11 is acted on with a constant electric signal which corresponds to a given position of deflection of the desired-value transmitter 2 from the idle position, equal, for instance, to 8°.

The negative second input 13 of the comparator 10 is acted on by the output signal of the desired-value transmitter 2 in such a manner that the size of the signal increases upon increasing deflection of the desired-value transmitter 2. If this signal thereby reaches the size of the constant signal present at the input 11, the comparator 10, which until then has given off a positive signal, now gives off a negative output signal to a first input 15 of an AND gate 14.

In the control line 17 of the second input 16 of the AND gate 14 there is arranged a pedal contact 18 which can be actuated by the gas pedal 1 and is open in the idle position of the gas pedal. With somewhat greater deflection of about 10° of the gas pedal 1 out of the idle position than the position of deflection determined by the voltage divider 12, contact 18 is closed.

Figure 2:
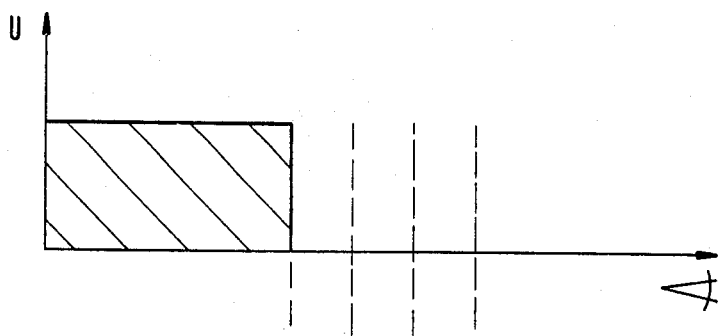
FIG. 2 is a switch-point diagram of the comparator signal of the first branch as a function of the angle of deflection of the gas pedal according to FIG. 1.
Figure 3:
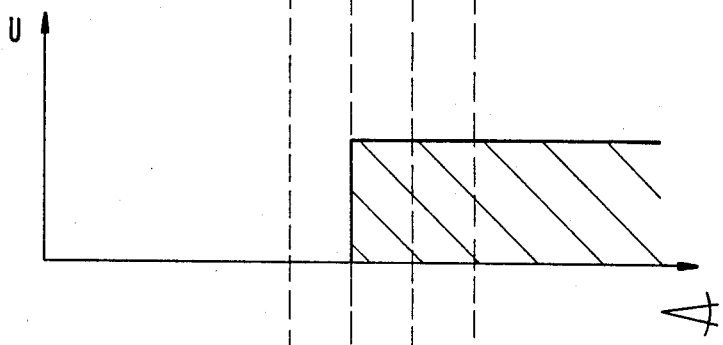
FIG. 3 is a switch-point diagram of the pedal-contact signal as a function of the angle of deflection of the gas pedal according to FIG. 1.

From FIG. 2, in which the input signal at the first input 15 of the AND gate 14, and from FIG. 3, in which the input signal on the second input of the AND gate 14 are plotted in each case as a function of the angle of deflection of the gas pedal 1, it can be noted that when the first branch 6 is intact no alarm signal can be given off at the output of the AND gate 14.

However, should the desired-value transmitter 2 or the pedal contact 18 be defective, there are then similar signals at the inputs 15 and 16 of the AND gate 14 and an alarm signal is thus produced at its output. In order to avoid, that, when the first branch 6 is intact an output signal produced during the interval between the switching of the two input signals of the AND gate 14 is recognized as an alarm signal and causes the light 8 to light up, an RC member 19, serving as time-delay member, is connected between the output of the AND gate 14 and the light 8.

The second branch 7 of the alarm circuit has a comparator 20 to whose first positive input 21 a voltage divider 22 is connected. By this voltage divider, said input 21 is acted on with a constant electric signal which corresponds to a given position of deflection of about 14° of the setting-member transmitter 29 out of the idle position.

The negative second input 23 of the comparator 20 is acted on by the output signal of the setting-member transmitter 29 in such a manner that the size of the signal increases upon increasing deflection of the setting-member transmitter 29. When this signal reaches the size of the constant signal present at the input 21, the comparator 20, which up to then has given off a positive signal, now gives off a negative output signal to a first input 25 of an AND gate 24. Since this first input 25 is inverted, the signal given off negative by the comparator which is detected by the AND gate 24 is positive.

In the control line 27 of the second input 26 of the AND gate 24 there is arranged a setting-member contact 28 which can be actuated by the setting member 5 and which is closed in the idle position of the setting member but, with a somewhat smaller deflection, of about 12°, of the setting member 5 out of the idle position than the position of deflection determined by the voltage divider 22, is open.

Figure 4:
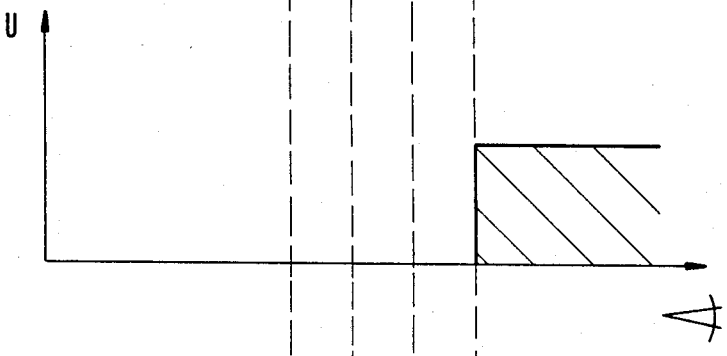
FIG. 4 is a switch-point diagram of the comparator signal of the second branch as a function of the angle of deflection of the gas pedal according to FIG. 1.
Figure 5:
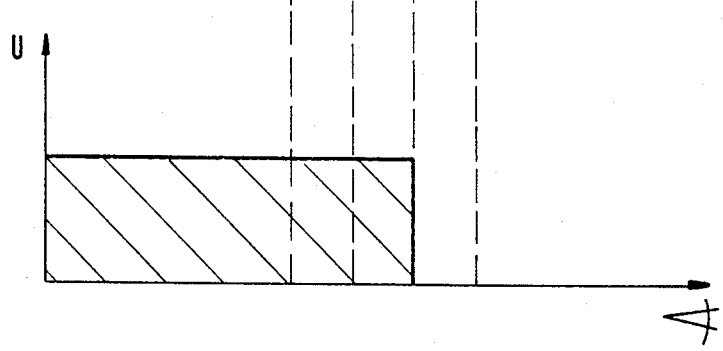
FIG. 5 is a switch-point diagram of the setting-member contact as a function of the angle of deflection of the gas pedal according to FIG. 1.

In FIG. 4, the signal detected by the AND gate 24 at the inverted input 25 is plotted, and FIG. 5 shows the signal detected at the input 26. It can be noted therefrom that when the second branch 7 is intact no alarm signal can be given off at the output of the AND gate 24.

In case of a defect in the setting-member transmitter 29 or setting-member contact 28, the AND gate 24 detects two similar signals and thus gives off an output signal. In this case also, a false-alarm signal upon switching is suppressed by the RC member 19.

In FIGS. 2-5 it can furthermore be noted that the switch point of the setting-member contact 28 lies at a greater deflection of the setting member 5 than the switch point of the pedal contact 18 upon corresponding deflection of the gas pedal 1. In this way interaction between the two branches 6 and 7 is avoided.

A storage member 30, developed as flip-flop, which is arranged in front of the light 8 sees to it that upon the feeding of an alarm signal the signal continuously activates the lamp 8 and thus does not cause it merely to light up briefly so that it might be overlooked.

Via a line 31, a produced alarm signal is also fed to the controller 3 which is so controlled by said alarm signal that it controls the setting drive 4 predominantly in a manner such as to reduce the load. In this way, a full-gas position of the setting member 5 is prevented but travel at low-speed in order to reach a repair shop is possible.

Definition

The expression "AND Gate" corresponds to the following truth table

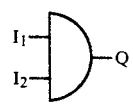

| $I_1$ | $I_2$ | Q |
|---|---|---|
| 0 | 0 | 0 |
| 0 | 1 | 0 |
| 1 | 0 | 0 |
| 1 | 1 | 1 |

We claim:

1. In a device for controlling the speed of travel of an automotive vehicle, having a desired-value transmitter adjustable by a gas pedal, the output signal of the desired-value transmitter acting on a setting member of an element controlling an fuel-air mixture for the vehicle, a setting-member transmitter which produces a signal corresponding to the position of the setting member, and an alarm circuit by which an alarm signal is feedable to an alarm device when with an unactuated desired-value transmitter the setting member is in a gas position, the improvement wherein said alarm circuit provides an indication of a defect in the alarm function, said alarm circuit comprising:
a first branch having means responsive to the position of the gas pedal and a signal from the desired-value transmitter for emitting an alarm signal at its output when with an actuated gas pedal, the desired-value transmitter produces an idle signal, and
a second branch having means responsive to the position of the setting member and a signal from the setting member for emitting an alarm signal at its output when, with the setting member being actuated, said setting-member transmitter produces an idle signal.

2. The device according to claim 1, wherein the output of the first branch and the output of the second branch are brought together for connection with an alarm device.

3. The device according to claim 1, wherein the alarm signal of the first branch can, in response to a sequence of defects beginning with the idle position of gas pedal and followed by the setting member, be emitted before the alarm signal of the second branch of the alarm circuit.

4. The device according to claim 1, wherein the first branch of the alarm circuit comprises a first comparator having a first input and a second input, first means for providing on the first input a constant electric signal which corresponds to a given position of deflection of the desired-value transmitter out of the idle position, and second means for providing the second input with an electric signal which corresponds to the instantaneous position of the desired-value transmitter, said alarm circuit comprising
first gate means having a first input and a second input for providing an AND function, the output of the comparator being fed to said first input of said first gate means, said second input of the first gate means receiving a signal when the gas pedal is deflected out of the idle position, and wherein the second branch of the alarm circuit comprises:
a second comparator having a first input and a second input, first means for providing to said first input a constant electric signal which corresponds to a given position of deflection of the setting-member transmitter out of the idle position, and second means for providing said second input with an electric signal which corresponds to the instantaneous position of the setting-member transmitter, said alarm circuit further comprising
second gate means having a first input and a second input for providing an AND function, the output of the second comparator being fed to the first input of said second gate means, the second input of said second gate means receiving a signal when the setting member is deflected from the idle position, and
both the output of the first gate means and the output of the second gate means being connected to the alarm device.

5. The device according to claim 4, wherein the first input of the first comparator is the positive input and at the negative input of the comparator, the desired-value transmitter provides a signal which increases in size upon an increase in the deflection of the gas pedal out of its idle position.

6. The device according to claim 4, wherein the first input of the second comparator is the positive input and the setting-value transmitter provides a signal, which increases in size upon an increase in the deflection of the setting member from its idle position, on the negative input of the comparator.

7. The device according to claim 4, further comprising
a pedal contact which can be actuated by the gas pedal and is open in the idle position of the gas pedal which pedal contact is coupled to the second input of the first gate means.

8. The device according to claim 4, further comprising
a setting-member contact actuatable by the setting member and being closed during the idle position of the setting member, said setting member contact being coupled to the second input of the second gate means,
the setting-member contact being opened when the setting member is actuated, and the first input of the second gate means being inverted.

9. The device according to claim 4, further comprising a pedal contact coupled to said gas pedal and wherein
the switch point of pedal contact lies at a greater deflection of the gas pedal out of the idle position than the switch point of the first comparator.

10. The device according to claim 4, further comprising a setting member contact coupled to the setting member and wherein
the switch point of the second comparator lies at a greater deflection of the setting member than a switch point of the setting-member contact.

11. The device according to claim 1, further comprising:
first and second voltage dividers,
the first inputs of the first and second comparators being connected respectively to said first and said second voltage dividers, and wherein
said desired-value transmitter and the setting-member transmitter each comprise a potentiometer, the second inputs of the first and second comparators being connected to respective ones of said potentiometers.

12. The device according to claim 1, further comprising
a setting member contact coupled to the setting member
a pedal contact coupled to said gas pedal, and wherein
the switch point of the setting-member contact is located at a greater deflection of the setting member than the switch point of the pedal contact upon corresponding deflection of the gas pedal.

13. The device according to claim 1, wherein the alarm device is a light.

14. The device according to claim 1, wherein the alarm circuit comprises a time-delay member arranged in series with the alarm device.

15. The device according to claim 14, wherein said time-delay member is an RC member.

16. The device according to claim 15, wherein said storage member is a flip-flop.

17. The device according to claim 14, wherein the alarm circuit comprises a storage member connected in series with the alarm device.

18. The device according to claim 1, further comprising
an electronic controller coupled between the desired-value transmitter and the setting device, the controller being responsive to the output signal of the alarm circuit so as to operate the speed controlling device in load-reducing manner.

19. In a device for controlling the speed of travel of an automotive vehicle, the device having a desired-value transmitter adjustable by a gas pedal, an output signal of the desired-value transmitter acting on a setting member of an element controlling an air-fuel mixture for the vehicle, the device including a setting-member transmitter which produces a signal corresponding to the position of the setting member, and wherein the device includes an alarm circuit by which an alarm signal can be fed to an alarm device under conditions when with an unactuated desired-value transmitter the setting member is in a gas position, the improvement wherein
said alarm circuit provides an indication of a defect in the alarm function, said alarm circuit comprising:
a gas pedal contact indicating a position of said gas pedal;
a setting member contact indicating a position of said setting member;
first means coupled to said pedal contact and said desired-value transmitter for signaling the coincidence of signals of said pedal contact and said desired-value transmitter;
second means coupled to said setting member contact and said setting-member transmitter for signaling the coincidence of signals of said setting member contact and said setting-member transmitter; and
means coupled to said first and said second signaling means for generating an alarm signal.

20. An alarm circuit according to claim 19, wherein
the signals applied to said first signaling means by said pedal contact and said desired-value transmitter are staggered in time during normal operation of said vehicle, and wherein
the signals applied to said second signaling means from said setting member contact and said setting-member transmitter are staggered in time during normal operation of said vehicle whereby the coincidence of such signals indicates a defect in the alarm circuit.

* * * * *